(12) United States Patent
Hogan et al.

(10) Patent No.: US 7,379,919 B2
(45) Date of Patent: May 27, 2008

(54) METHOD AND SYSTEM FOR CONDUCTING SECURE PAYMENTS OVER A COMPUTER NETWORK

(75) Inventors: Edward J. Hogan, Larchmont, NY (US); Carl M. Campbell, Newtown Square, PA (US)

(73) Assignee: Mastercard International Incorporated, Purchase, NY (US)

( * ) Notice: Subject to any disclaimer, the term of this patent is extended or adjusted under 35 U.S.C. 154(b) by 346 days.

(21) Appl. No.: 09/833,049

(22) Filed: Apr. 11, 2001

(65) Prior Publication Data

US 2002/0035548 A1 Mar. 21, 2002

Related U.S. Application Data

(60) Provisional application No. 60/195,963, filed on Apr. 11, 2000.

(51) Int. Cl.
*G06Q 99/00* (2006.01)
(52) U.S. Cl. ............................................ 705/64; 705/40
(58) Field of Classification Search ................. 705/64, 705/40
See application file for complete search history.

(56) References Cited

U.S. PATENT DOCUMENTS

| | | | |
|---|---|---|---|
| 3,665,161 A | 5/1972 | Oberhart | |
| 3,845,277 A | 10/1974 | Voss et al. | |
| 4,016,405 A | 4/1977 | McCune et al. | |
| 4,234,932 A | 11/1980 | Gorgens | |
| 4,253,017 A | 2/1981 | Whitehead | |
| 4,314,362 A | 2/1982 | Fought | |
| 4,390,968 A | 6/1983 | Hennessy et al. | |
| 4,438,326 A | 3/1984 | Uchida | |
| 4,458,142 A | 7/1984 | Bernstein | |

(Continued)

FOREIGN PATENT DOCUMENTS

AU 6053700 1/2001

(Continued)

OTHER PUBLICATIONS

Notice of Allowability for U.S. Appl. No. 09/886,486 of Hogan et al.

(Continued)

*Primary Examiner*—Pierre Eddy Elisca
(74) *Attorney, Agent, or Firm*—Baker Botts LLP; Manu J. Tejwani

(57) ABSTRACT

A method is provided for conducting a financial transaction by a purchaser with a merchant having an acquirer bank, over a communications network. The method includes the steps of sending a first authorization request using a pseudo account number associated with a real account number to a service provider which forwards a second authorization request to the issuer using the real account number and preferably a pseudo acquirer code associated with the service provider such that the response to the second request is based on the real account number and sent back to the service provider who preferably forwards a response to the first request preferably to the "real" acquirer. A message authentication code is further provided which includes transaction data, and where the authorization request is formatted as a standard payment card track having one or more fields including a discretionary field in which the message authentication code is placed.

12 Claims, 3 Drawing Sheets

U.S. PATENT DOCUMENTS

| | | | |
|---|---|---|---|
| 4,755,940 | A | 7/1988 | Brachtl et al. |
| 4,926,480 | A | 5/1990 | Chaum |
| 4,928,001 | A | 5/1990 | Masada |
| 4,959,788 | A | 9/1990 | Nagata et al. |
| 4,960,982 | A | 10/1990 | Takahira |
| 5,168,520 | A | 12/1992 | Weiss |
| 5,317,636 | A | 5/1994 | Vizcaino .................... 380/23 |
| 5,371,797 | A | 12/1994 | Bocinsky, Jr. |
| 5,373,558 | A | 12/1994 | Chaum |
| 5,375,037 | A | 12/1994 | Le Roux |
| 5,434,398 | A | 7/1995 | Goldberg |
| 5,434,919 | A | 7/1995 | Chaum |
| 5,438,186 | A | 8/1995 | Nair et al. |
| 5,440,108 | A | 8/1995 | Tran et al. |
| 5,444,616 | A | 8/1995 | Nair et al. |
| 5,448,047 | A | 9/1995 | Nair et al. |
| 5,455,407 | A | 10/1995 | Rosen |
| 5,538,442 | A | 7/1996 | Okada |
| 5,557,518 | A | 9/1996 | Rosen |
| 5,578,808 | A | 11/1996 | Taylor |
| 5,590,197 | A | 12/1996 | Chen et al. |
| 5,623,552 | A | 4/1997 | Lane |
| 5,671,280 | A | 9/1997 | Rosen |
| 5,678,010 | A | 10/1997 | Pittenger et al. |
| 5,754,656 | A | 5/1998 | Nishioka et al. |
| 5,761,306 | A | 6/1998 | Lewis .................... 380/21 |
| 5,761,309 | A | 6/1998 | Ohashi et al. |
| 5,790,677 | A | 8/1998 | Fox et al. .................... 380/24 |
| 5,850,442 | A | 12/1998 | Muftic |
| 5,883,810 | A | 3/1999 | Franklin et al. ........ 364/479.02 |
| 5,903,878 | A | 5/1999 | Talati et al. .................... 705/26 |
| 5,936,226 | A | 8/1999 | Aucsmith |
| 5,991,412 | A | 11/1999 | Wissenburgh et al. |
| 6,000,832 | A * | 12/1999 | Franklin et al. ............ 700/232 |
| 6,005,942 | A * | 12/1999 | Chan et al. .................. 713/187 |
| 6,018,717 | A | 1/2000 | Lee et al. |
| 6,072,870 | A | 6/2000 | Nguyen et al. ............... 380/24 |
| 6,078,888 | A | 6/2000 | Johnson, Jr. |
| 6,078,902 | A * | 6/2000 | Schenkler .................... 705/35 |
| 6,098,053 | A | 8/2000 | Slater |
| 6,105,012 | A * | 8/2000 | Chang et al. .................. 705/64 |
| 6,111,953 | A | 8/2000 | Walker et al. |
| 6,122,625 | A | 9/2000 | Rosen |
| 6,205,436 | B1 * | 3/2001 | Rosen .................... 705/65 |
| 6,206,293 | B1 | 3/2001 | Gutman et al. |
| 6,213,403 | B1 | 4/2001 | Bates, III |
| 6,227,447 | B1 | 5/2001 | Campisano ................. 235/380 |
| 6,263,446 | B1 * | 7/2001 | Kausik et al. ............... 713/201 |
| 6,324,525 | B1 * | 11/2001 | Kramer et al. ................ 705/40 |
| 6,327,578 | B1 | 12/2001 | Linehan |
| 6,332,134 | B1 | 12/2001 | Foster |
| 6,343,284 | B1 | 1/2002 | Ishikawa et al. |
| 6,370,514 | B1 | 4/2002 | Messner .................... 705/14 |
| 6,394,343 | B1 | 5/2002 | Berg et al. |
| 6,473,740 | B2 * | 10/2002 | Cockrill et al. ............... 705/27 |
| 6,518,927 | B2 | 2/2003 | Schremmer et al. |
| 6,574,730 | B1 | 6/2003 | Bissell et al. |
| 6,636,833 | B1 | 10/2003 | Flitcroft et al. |
| 6,915,279 | B2 | 7/2005 | Hogan et al. |
| 6,990,470 | B2 | 1/2006 | Hogan et al. |
| 7,058,611 | B2 | 6/2006 | Kranzley et al. |
| 2001/0034720 | A1 | 10/2001 | Armes .................... 705/65 |
| 2001/0037451 | A1 | 11/2001 | Bhagavatula et al. ....... 713/155 |
| 2001/0047281 | A1 | 11/2001 | Keresman, III et al. ........ 705/2 |
| 2001/0047335 | A1 | 11/2001 | Arndt et al. .................. 705/44 |
| 2001/0051902 | A1 | 12/2001 | Messner .................... 705/26 |
| 2002/0032633 | A1 | 3/2002 | Messner |
| 2002/0032663 | A1 | 3/2002 | Messner .................... 705/72 |
| 2002/0035548 | A1 | 3/2002 | Hogan et al. |
| 2002/0046169 | A1 | 4/2002 | Keresman, III et al. ...... 705/41 |
| 2002/0052784 | A1 | 5/2002 | Sherwin et al. ............... 705/14 |
| 2002/0083010 | A1 | 6/2002 | Kim |
| 2002/0120584 | A1 | 8/2002 | Hogan et al. ................. 705/67 |
| 2003/0120615 | A1 | 6/2003 | Kuo |
| 2004/0210499 | A1 * | 10/2004 | Breck et al. .................... 705/1 |

FOREIGN PATENT DOCUMENTS

| | | |
|---|---|---|
| AU | 6053700 | 11/2005 |
| EP | 1 017 030 A2 | 5/2000 |
| EP | 1 017 030 | 7/2000 |
| EP | 1 028 401 | 8/2000 |
| EP | 1 028 401 A2 | 8/2000 |
| JP | 02002117353 A * | 4/2002 |
| WO | WO 92/16913 | 10/1992 |
| WO | WO 99/05633 | 2/1999 |
| WO | WO 00/33497 | 6/2000 |
| WO | WO 01/01622 A2 | 1/2001 |
| WO | WO 01/07873 A2 | 2/2001 |
| WO | WO 01/26062 A1 | 4/2001 |
| WO | WO 01/67215 A2 | 9/2001 |
| WO | WO 01/69556 | 9/2001 |
| WO | WO 01/71675 | 9/2001 |
| WO | WO 01/78024 | 10/2001 |
| WO | WO 01/84509 A2 | 11/2001 |
| WO | WO 02/15077 A1 | 2/2002 |

OTHER PUBLICATIONS

Hogan et al. U.S. Appl. No. 60/280,776, entitled "Improved System and Method for Secure Payment Application (SPA) and Universal Cardholder Authentication," filed Apr. 2, 2001.

Hogan et al. U.S. Appl. No. 60/255,168, entitled "Method and System for Conducting Secure Electronic Commerce Transactions," filed Aug. 14, 2000.

Hogan et al. U.S. Appl. No. 60/226,227, entitled "Method and System for Conducting Secure MasterCard Payments Over a Computer Network." filed Aug. 18, 2000.

Hogan et al. U.S. Appl. No. 60/213,063, entitled "An Improved Method and System for Conducting Secure Payments Over a Computer Network," filed Jun. 21, 2000.

Hogan et al. U.S. Appl. No. 09/809,367, entitled "Method and System for Secure Payments Over a Computer Network," filed Mar. 15, 2001.

Hogan et al. U.S. Appl. No. 60/274,785, entitled "System and Method for Secure Payment Application (SPA) and Universal Cardholder Authentication," filed Mar. 9, 2001.

Hogan et al. U.S. Appl. No. 60/295,630, entitled "Method and Process for a Secure Payment Application Using a Universal cardholder Authentication Field," filed Jun. 4, 2001.

Hogan et al. U.S. Appl. No. 60/307,575, entitled "Method and System for Conducting Transactions Over a Communication Network Using a Secure Payment Application," filed Jul. 24, 2001.

Hogan et al. U.S. Appl. No. 60/213,325, entitled "Method and System for Conducting Secure Electronic Commerce Transaction," filed Jun. 22, 2000.

EMV'96 Integrated Circuit Card Application Specification for Payment System, Version 3.1.1 (May 31, 1998).

ISO/IEC JTC 1/SC 27 Information Technology—Security Techniques (May 10, 1999).

* cited by examiner

METHOD AND SYSTEM FOR CONDUCTING SECURE PAYMENTS OVER A COMPUTER NETWORK

PRIORITY APPLICATIONS

This application claims priority to U.S. Provisional application Ser. No. 60/195,963, filed on Apr. 11, 2000, and entitled "Method and System for Conducting Secure Payments Over A Computer Network," which is hereby incorporated by reference, and to U.S. application Ser. No. 09/809,367, filed Mar. 15, 2001, and entitled "Method and System for Secure Payments Over A Computer Network," also incorporated by reference.

BACKGROUND OF INVENTION

This invention relates to a method and system for conducting secure financial transactions over a communications network and more particularly to a method and system for transmitting payments securely over a computer network, such as the Internet, and for transmitting sensitive information securely over public communication channels.

As is self-evident, on-line commerce has experienced tremendous growth over the last few years but even with that growth consumers are still troubled and concerned about using personal financial information and transmitting such information, such as credit card numbers and personal identification numbers, over public communications networks, such as the Internet. As a result, over the last few years, companies have struggled to find a way—the best way—to ensure the security of payments made over a computer network and to decrease the risk of theft or misuse of financial information.

For example, U.S. Pat. No. 5,883,810 entitled "Electronic On line Commerce Card With Transaction Proxy Number For On line Transactions" and assigned to Microsoft Corporation, is directed to a system which provides for each transaction a temporary transaction number and associates it with the permanent account number; the transaction number looks like a real credit card number and the customer uses that transaction number and submits it to the merchant as a proxy for the customer account number. In this matter, the customer does not have to transmit over a public network his or her real credit card number.

In the '810 patent, the merchant passes along the transaction number to the issuing institution, which in turn uses the transaction number as an index, accesses the real customer account number and processes the authorization, sending the authorization reply back to the merchant under the transaction number. As a result, risk is purportedly minimized not only because the customer only transmits a transaction number but also because the proxy number is good only for a single purchase—theft "would not greatly benefit a thief because it cannot be repeatedly used for other purchases or transactions." Col. 2, lines 60-61.

There is a need to improve upon the prior art systems and in particular there is a need for a method and system for conducting a secure financial transaction over the Internet which avoids requiring the creation and transmission of a unique repeatedly generated transaction number to replace the transmission of the permanent account number for each conducted transaction.

According to the invention of co-pending application Ser. No. 09/809,367, filed Mar. 15, 2001, which is incorporated herein by reference, a "pseudo" account number is assigned to a customer and cryptographically linked to a consumer's payment account number. The payment account number is an account number issued by a financial institution or other organization that a consumer may use to make a payment for goods and/or services. For example, the payment account number may be the account number from a payment card, such as a credit or debit card, or from a payment application, such as an electronic cash application stored on a consumer's computer. The pseudo account number appears to be an actual payment account number to a merchant. That is, the pseudo account number has the same length as a valid payment account number and begins with a valid identification number (e.g., a "5" for MasterCard International Incorporated ("MasterCard")). The pseudo account number is used by the customer instead of the real account number for all of his or her on-line financial transactions.

According to the invention of the co-pending application Ser. No. 09/809,367, all transactions based on pseudo account numbers are preferably cryptographically authenticated using a secret key that is unique for each account number. The authentication may be based on the private key of a public-key pair ("public-key authentication"), or based on a secret key other than a private key ("secret-key authentication"). Thus, if unauthorized persons were to ascertain any pseudo account numbers, they would be unable to make fraudulent transactions using them.

This system can still be improved upon and security can be further enhanced to protect the messages and information being transmitted during or in connection with a financial transaction being conducted over public communications lines.

SUMMARY OF INVENTION

According to the present invention, therefore, a method of conducting a transaction using a payment network is provided, in which a service provider receives a first authorization request for the authorization of a transaction using a first payment account number, wherein:

(i) the first payment account number has a BIN code associated with the service provider, and is associated with a second payment account number having a BIN code associated with an issuer of said second number;

(ii) the first authorization request includes an acquirer code associated with an acquirer; and (iii) the first authorization request is routable through the payment network to the service provider based on the BIN code of the first payment account number.

The method further includes having the service provider respond to the first authorization request by transmitting a second authorization request for authorization of the transaction using the second payment account number, the second authorization request including an acquirer code associated with the service provider and being routable through the payment network to the issuer based on the BIN code of the second payment account number.

Additionally, a response to the second authorization request is received by the service provider from the issuer, where the response includes the acquirer code associated with the service provider and is routable through the payment network based on that code. A response to the first authorization request is then transmitted by the service provider to the acquirer based on the response to the second authorization request, and the response to the first authorization request preferably includes the acquirer code associated with the acquirer and is routable through the payment network based on that code.

Another preferred embodiment of the invention includes a method of conducting a transaction with a merchant using a first payment account number that is associated with a second payment account number, where the method comprises: (a) generating a message authentication code based on one or more transaction details; (b) transmitting at least the first payment account number and the message authentication code to the merchant; (c) requesting by the merchant an authorization for payment of the transaction using the first payment account number, the request being formatted as if payment were tendered at a point-of-sale terminal with a conventional magnetic-stripe payment card, the message authentication code being transmitted in a discretionary data field contained in a track of the type used in the magnetic stripe of said conventional payment card; (d) responding to the authorization request for the first payment account number by requesting an authorization for payment of the transaction using the associated second payment account number; and (e) accepting or declining the authorization request for the first payment account number based on the response to the authorization request for the second payment account number and the message authentication code.

BRIEF DESCRIPTION OF THE DRAWINGS

Further objects, features and advantages of the invention will become apparent from the following detailed description taken in conjunction with the accompanying figures showing a preferred embodiment of the invention, on which.

Figure 1:
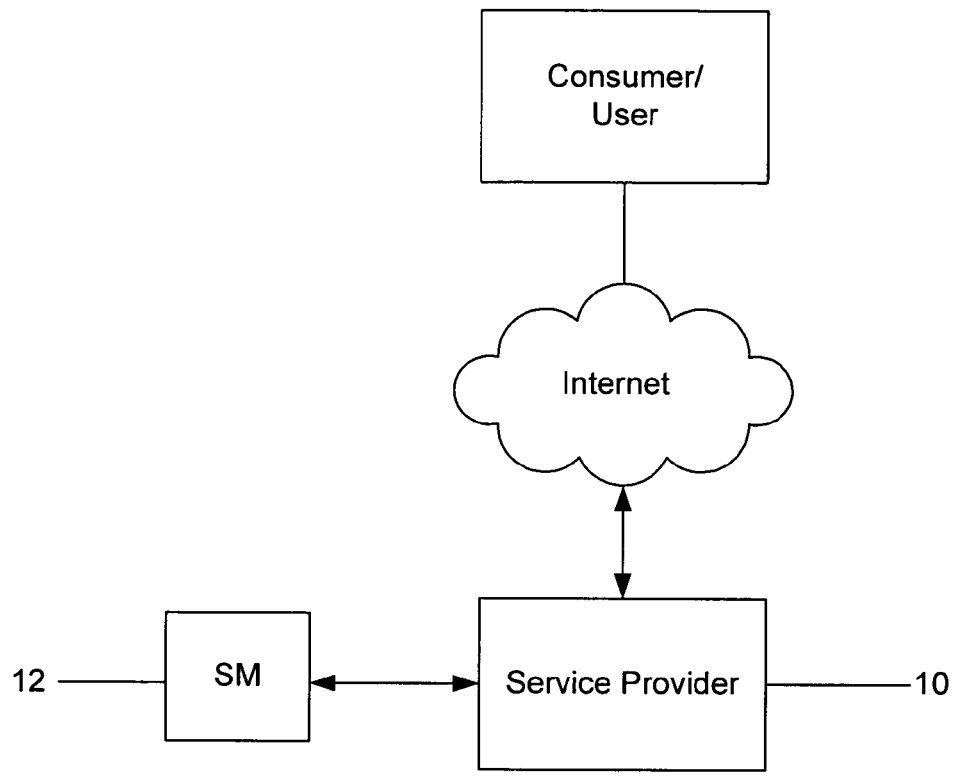
FIG. 1 is a block diagram of the system for obtaining a secure payment application from a provider over the Internet in accordance with the invention.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION OF THE PREFERRED EMBODIMENT

Initialization of the Secure Payment Application

In accordance with a preferred embodiment of the invention, a service provider issues, maintains and/or processes several components, including a secure payment application ("SPA"), of the secure payment system to be conducted in accordance with the techniques of the present invention.

FIG. 1 illustrates first how a cardholder with a financial transaction card may obtain a secure payment application from the service provider 10 over the Internet, according to an exemplary embodiment of the present invention. It should initially be understood that a physical card is not necessary to utilize and obtain the benefits of the invention, but that only an account number be issued to a holder (in this case a cardholder) which identifies and links a user or participant to an account for purposes of conducting a financial transaction. The cardholder may contact a web server associated with the service provider using any appropriate device that may communicate over the Internet, such as a computer, cellular phone, or a personal digital assistant (PDA). For the purpose of simplicity in the following discussions, it is assumed that the cardholder uses a computer to communicate over the Internet.

As shown in FIG. 1, the service provider, for example MasterCard International Incorporated (or an agent of MasterCard), has in its control one or more physically secure security modules 12, which offer physical protection for the information stored inside the modules. These security modules each contain one or more "derivation keys" that are used to create and re-create account-unique secret cryptographic keys, as explained below, which are provided within the secure payment application.

First, in accordance with a preferred embodiment of the invention, the cardholder must obtain an SPA from the service provider. The preferable steps for downloading and initializing the secure payment application (SPA) include:

1. The cardholder contacts the service provider's web site via the Internet (either directly or through a hyperlink to the web site through another web site, such as an issuer's web site.

2. The cardholder provides, under SSL encryption generally known to those skilled in the art, (a) a payment card account number, (b) a card expiration date, and (c) card authenticating information. The card authenticating information may include, for example, the card's CVC2 value, which refers to a three or four digit value that is printed next to the signature panel of some cards. This value is generated by the issuing bank using a secret cryptographic key and can be verified using this same key.

3. The service provider may confirm the legitimacy of the card account number and the card expiration date by obtaining a zero amount authorization from the issuer of the cardholder's payment card. For instance, MasterCard may obtain this authorization over its Banknet™ communications network.

4. The service provider may verify the CVC2 value if the issuer of the cardholder's payment card has provided the service provider with the cryptographic key(s) for verifying the CVC2 value.

5. The service provider may verify other card authenticating information by sending such information to the issuer for verification.

6. After the service provider ("SP") has confirmed the legitimacy of the cardholder-provided card data, the SP creates or selects a pseudo account number and a secret key and embeds these data elements into a secure payment software application that is made available to the cardholder for download over the Internet preferably under SSL encryption.

The pseudo account number has as its BIN a special BIN reserved for pseudo account numbers. The remainder of the pseudo account number is a value that can be translated by the service provider via a table look-up process to the "real" account number.

Preferably, the assigned special service provider BIN may be one from a set of many such special BINs, where each BIN may correspond to a particular country or region and/or to a particular product within a country or region. Thus, the assigned special BIN may be the one that corresponds to the country and/or the product of the submitted "real" account number.

The secret key that the service provides preferably embeds in an SPA is unique for each card account number and is preferably derived within a security module using the card account number and a derivation key. This derivation key may itself be derived within the same or another security module using a higher-level derivation key.

The cardholder may provide a password to the service provider prior to downloading the secure payment application or may select a password when the secure payment application is being installed on the cardholder's computer. If a password is provided or selected, the cardholder will thereafter be required to enter this password in order to activate the secure payment application. The password selected by the cardholder may be used to encrypt the secret key included in the SPA.

As would be recognized by those skilled in the art, the SPA may be downloaded as part of a digital wallet application. In addition to the SPA, the digital wallet may store a cardholder's personal information and other applications, such as a purse application.

Generating Card-unique Secret Keys

The following steps may preferably be performed within a security module 12 controlled by the service provider or one of its agents to obtain a card-unique secret key to be included in the secure payment application. The following steps assume that the cardholder's payment card has a 16-digit account number and that the Data Encryption Algorithm (DEA) known to those skilled in the art, with a double-length key is used. The DEA is a U.S. Government standard cryptographic algorithm that is described in Federal Information Processing Standard (FIPS) 46-1, which is incorporated herein by reference in its entirety. The DEA is also defined in the ANSI standard X9.32, which is also incorporated herein by reference in its entirety.

It is also assumed that the security module holds a secret high-level key called the derivation key that consists of 16 bytes and is used with many or all card account numbers to cryptographically compute a card-unique secret key, called the Per-Card Key, given the cardholder's 16-digit payment account number. The derivation key may be unique for each country or for each special bank identification number or BIN.

Preferably, the steps are:
1. Considering the payment account number as 16 binary-coded-decimal digits of 4 bits each, DEA-encrypt these 64 bits using as the encryption key the left-most 8 bytes of the 16-byte Derivation Key.
2. DEA-decrypt the result of Step 1 using as the decryption key the right-most 8 bytes of the 16-byte Derivation Key.
3. DEA-encrypt the result of Step 2 using as the encryption key (again) the left-most 8 bytes of the 16-byte Derivation Key.
4. Use the result of Step 3 as the left-most 8 bytes of the unique Per-Card Key.
5. DEA-encrypt the result of Step 3 using as the encryption key the left-most 8 bytes of the 16-byte Derivation Key.
6. DEA-decrypt the result of Step 5 using as the decryption key the right-most 8 bytes of the 16-byte Derivation Key.
7. DEA-encrypt the result of Step 6 using as the encryption key (again) the left-most 8 bytes of the 16-byte Derivation Key.
8. Use the result of Step 7 as the right-most 8 bytes of the 16-byte unique Per-Card Key, and place this key in the secure payment application in such a way that it will not be disclosed during the normal operation of this application.

Communication Between Cardholder and Merchant

Figure 2:
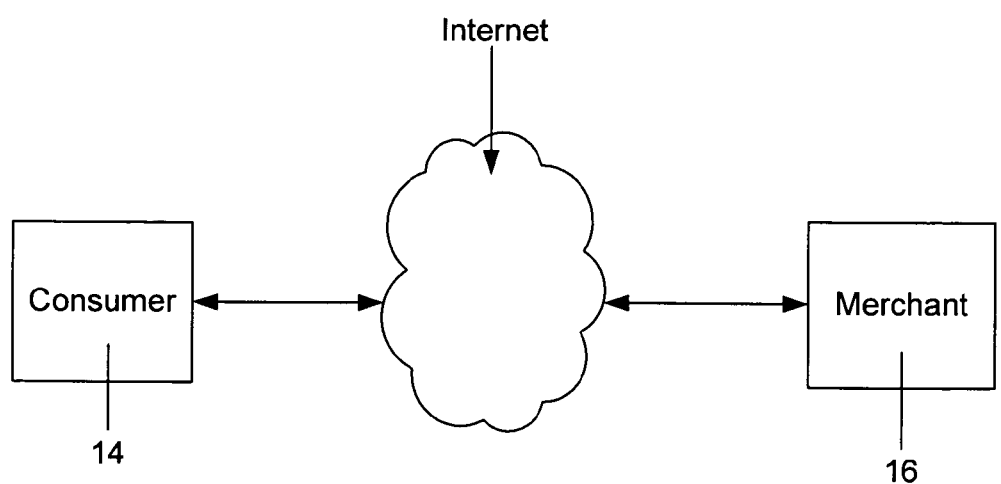
FIG. 2 is a flow diagram illustrating the flow of information between a cardholder and a merchant when conducting a secure payment over the Internet using the present invention.

FIG. 2 illustrates the flow of information between the cardholder 14 and merchant 16 when conducting a secure payment over the Internet according to an exemplary embodiment of the present invention.

Once the SPA has been installed on a cardholder's computer, the cardholder preferably uses the SPA for all Internet payments and the SPA provides the cardholder's pseudo account number for all Internet transactions.

Once a cardholder has indicated a desire to conduct a transaction, it is desirable (but not essential) that the merchant pass to the cardholder's computer the following data elements: (1) the acquirer BIN, (2) the MID (the merchant identifier as known to the acquirer), and (3) the date and time (GMT or equivalent) of the transaction.

Preferably, the SPA uses its embedded, secret key to create a Message Authentication Code (MAC) relating to the transaction. For example, a MAC of approximately 8 decimal digits may be created on the following data elements:
1. A transaction sequence number stored in the cardholder's SPA and incremented by the SPA whenever it generates a MAC. This transaction sequence number may be, for example, six (6) decimal-digits in length.
2. The acquirer BIN if received from the merchant, otherwise zeros (which may be, for example, 6 decimal digits).
3. The MID if received from the merchant, otherwise zeros (which may be, for example, 6 decimal digits).
4. Date and time, to the nearest hour or minute (in GMT), if received from the merchant, otherwise zeros (which may be, for example, 10 decimal digits).
5. The transaction amount, as displayed for the cardholder, and as normally included in the message from cardholder to merchant (which may be, for example, 8 decimal digits).

Preferably, a merchant is able to accept a full Track 1 image from the cardholder's computer, just as if the merchant were prepared to communicate with computers that include magnetic-stripe readers. (The Track 1 image refers to the data on track 1 of the magnetic stripe of a payment card.) Moreover, the merchant preferably is able to pass the Track-1 data to the acquirer as if the transaction were a point-of-sale (POS) transaction.

If the merchant can accept the full Track 1 data, the MAC itself and the data elements upon which the MAC is based are placed in the Track 1 discretionary-data field. The pseudo account number is placed in the Track 1 account-number field, and the card expiration date is placed in the Track 1 expiration-date field.

By sending the MAC in the Track 1 discretionary-data field, many merchants will not need to make any changes to their systems and/or software because they can already handle POS transactions, which include Track 1 discretionary data. For other merchants, systems and/or software to handle POS transactions are readily available.

If a merchant cannot accept the full Track 1 data, the SPA may send a conventional SSL payment message, except that the pseudo account number is used instead of the cardholder's "real" account number. The merchant then sends the transaction data to the acquirer in the manner that it normally does. In practice, during a transition period, the merchants that are not capable of handling POS transactions with Track 1 data might not be required to receive and handle MACs.

Instead of being sent in the Track 1 discretionary-data field, the MAC may also be sent in another format, in which case merchants and acquirers may be required to change their systems and/or software to handle this other format.

Upon receipt of the cardholder's transaction message, the merchant formats a conventional authorization request for the acquirer. For those merchants that are able to able to accept Track 1 data, this authorization request will be formatted exactly as if it originated from a POS terminal and will include the Track 1 data provided by the cardholder.

Should a merchant initiate multiple authorization/clearing transactions for a cardholder transaction, preferably only the first of these transactions will include the Track-1 data. The subsequent transactions will include only the pseudo account number and expiration date and may be considered mail-order-telephone-order transactions. This is true for all recurring payments and partial payments with multiple clearings.

Acquirer Handling of Authorization Request

Figure 3:
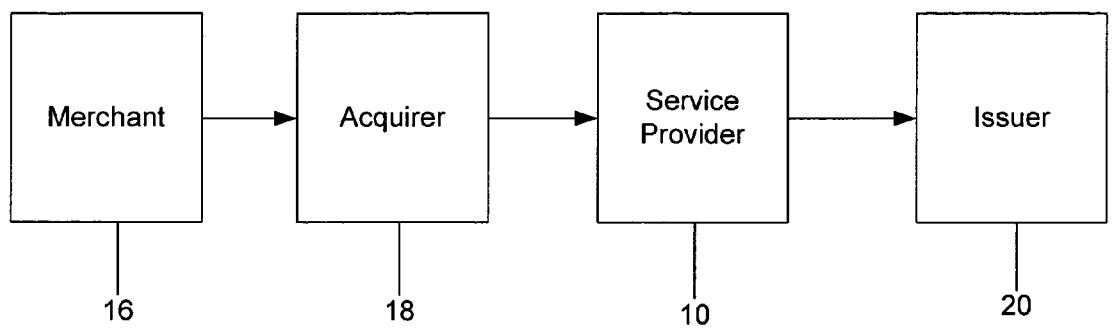
FIG. 3 is a flow diagram illustrating the flow of information between an acquirer, a service provider and an issuer, in accordance with the present invention.

FIG. 3 illustrates the communication between an acquirer 18, service provider 10, and an issuer according to an exemplary embodiment of the present invention.

The presence of Track 1 data in an Internet transaction should not adversely impact those acquirers who receive transactions from Internet merchants via conventional telephone lines, since such transactions will be formatted identically to transactions from conventional point-of-sale terminals. However, acquirers who receive transactions via the Internet (and not conventional telephone) may need a "conversion box" that would deliver transactions without Track 1 data unchanged and would deliver transactions with Track 1 data over a different physical wire as if they had come from POS terminals. The design of such a conversion box is well within the ability of a person of ordinary skill in the art.

When an acquirer 18 receives an authorization request message from an Internet merchant 16, it looks up the issuer BIN in its BIN table. In the case of a pseudo account number transaction, the "issuer" will correspond to a service provider-authorized processing facility 10, which will receive the request. In the case of a non-pseudo or real account number, normal processing will take place.

Some countries may have a special security-module-equipped facility that handles domestic transactions. Each such domestic facility would preferably be set up only with the service provider's approval and would hold only the cryptographic keys and account-number conversion data for the country whose transactions it processes. In countries with such a domestic facility, all same-country transactions will be sent to this facility. This can also be done for individual banks in a country, if it is so desired.

A domestic facility to handle domestic transactions would be far more efficient than causing domestic transactions to go through a central processing facility.

Service Provider Handling of the Authorization Request

When the service provider receives the request, it determines from the issuer BIN whether the account number is really a pseudo account number and, if so, sends the transaction to a special system for processing. This system translates the pseudo account number to the "real" account number using a table-lookup procedure. If the system determines that a Track-1 image is included, it uses a security module to derive the appropriate Per Card Key for this card account number in order to verify the MAC. (The derivation of the Per Card Key is described above.)

If the MAC is verified, the system then examines the BIN in the Track-1 discretionary-data area. If this is not all zeros, the system compares this BIN with the acquirer BIN of the transaction, and verifies that the date and time included in the Track 1 discretionary-data area are reasonable (taking into consideration that the merchant may batch its transactions and obtain delayed authorizations). The system also verifies that the authorization request amount does not exceed the transaction amount in the Track 1 discretionary-data area (the amount as approved by the cardholder) by more than a specified amount (e.g., 20%).

It is possible that an acquirer may include the MID in the Acquirer Reference Data (which is also called the Acquirer Reference Number). It is assumed that the 23-digit Acquirer Reference Data includes a mandatory "transaction type" indicator and a mandatory acquirer BIN, but that the remaining digits are for the acquirer's discretionary use and may in some cases include the MID. The service provider may obtain from its Internet acquirers an indication of which acquirers include the MID in the Acquirer Reference Data, and if so, where in the Acquirer Reference Data they include it. In the case of such an acquirer, if the Track-1 image includes an acquirer BIN (rather than six zeros), the service provider system may also verify that the MID in the Track 1 discretionary-data area matches the MID in the Acquirer Reference Data.

The service provider system may store a history of transaction sequence numbers (TSNs) for comparison with transaction sequence numbers in authorization requests. The comparison may be triggered by some condition, such as when the Track 1 amount exceeds some specified threshold (e.g., $200). Such a threshold may be lower when the Track 1 image does not include an acquirer BIN. When the comparison is triggered, the system may compare the transaction sequence number included in the Track 1 discretionary-data area against the stored history of transaction sequence numbers for the relevant card account number. If the transaction sequence number of the current transaction is 1) higher than the smallest stored value for the current account number and 2) does not match any stored value for this account, there is a reasonable assurance that the current transaction is not the fraudulent replay of data from a previous legitimate transaction.

The stored history of TSNs may be limited to a predetermined number of TSNs. For example, the system might store only the last 10 transaction sequence numbers received for a particular card account number. In addition, the verification of transaction sequence numbers need not occur in real time. It may occur while the system is obtaining an authorization from an issuer.

The purpose of these checks is to make it very difficult for wrongdoers who operate in collusion with Internet merchants and who may be able to obtain unencrypted transaction data to fraudulently replay data from legitimate transactions.

Once the service provider system has completed the above-described verification processes (with the possible exception of the transaction sequence number verification), the system formats an authorization request message for the issuer 20. This message includes the "real" account number and expiration date, but excludes the other Track 1 data. The system replaces the acquirer BIN with one of the special BINs that serves as a "pseudo" acquirer BIN. The acquirer BIN is replaced so that the issuer responds to the service provider instead of the acquirer.

In order for the acquirer and issuer to compute interchange fees correctly, the pseudo acquirer BIN should preferably correspond to the country in which the acquirer is located or to another country or region that will provide the same resultant interchange fees. If each country has a special BIN associated with it, the service provider may replace the acquirer BIN with the special BIN associated with the acquirer's country. If an acquirer's country does not have a special BIN associated with it, a special BIN associated with another country may be selected that results in the same interchange fees.

The service provider stores in a database the Acquirer Reference Data received in the authorization request from the acquirer (hereinafter referred to as the "original Acquirer Reference Data"). In formatting an authorization message for the issuer, the service provider preferably replaces the original Acquirer Reference Data with "pseudo" Acquirer Reference Data that includes the pseudo acquirer BIN, an appropriate transaction-type indicator, and an index value that the service provider can use to find the original Acquirer Reference Data.

When a domestic facility processes a pseudo-account-number transaction, it operates as described above. Preferably, however, this domestic facility will process only transactions for domestic issuers, and therefore will need only the cryptographic keys and account-number conversion table entries that apply to that country.

Issuer Handling of Authorization Request

Figure 4:
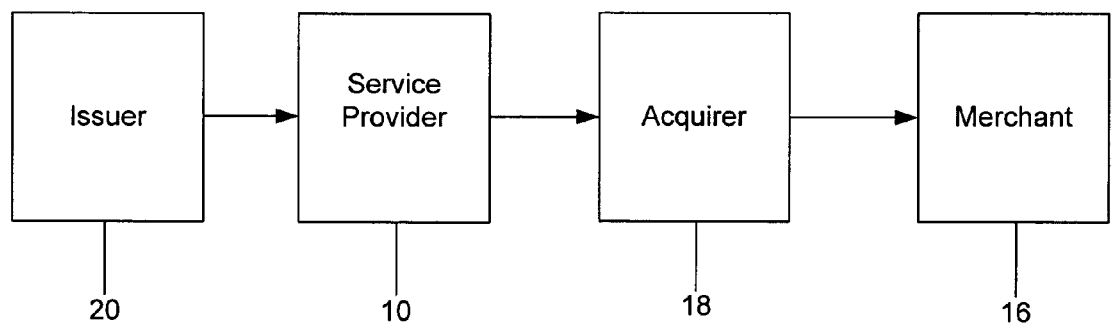
FIG. 4 is a flow diagram illustrating the flow of information between an issuer, a service provider and an acquirer, in accordance with the present invention.

FIG. 4 illustrates the communication between the issuer 20, the service provider 10, and an acquirer 18 according to an exemplary embodiment of the present invention after the issuer has received an authorization request from the service provider or from an authorized domestic processing facility.

The issuer 20 authorizes the transaction just as it would any other transaction. It sends the authorization response back to the "pseudo" acquirer BIN, which will be either a service provider facility or a facility authorized by a service provider.

When the service provider 10 receives an authorization response from an issuer, it examines the acquirer BIN to determine whether it is a "pseudo" acquirer BIN. If so, the service provider determines that the authorization response corresponds to a pseudo account number transaction that must be "restored" to its original format. Thus, the service provider translates the "real" account number back to the pseudo account number, and restores the Acquirer Reference Data that had been in the original transaction. The service provider then transmits the resulting message to the "real" acquirer, which processes the transaction normally and sends the authorization response to the merchant in the normal way. The merchant responds to the authorization response as it would for any other transaction.

Settlement and Clearing

Figure 5:
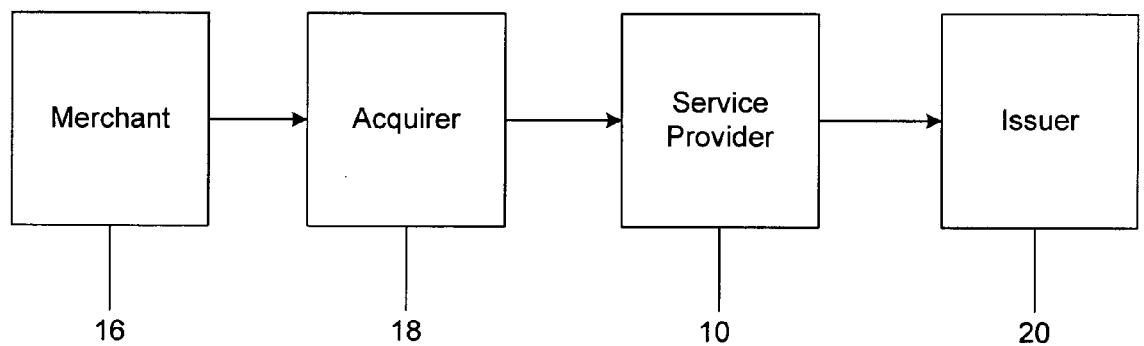
FIG. 5 is a flow diagram illustrating the flow of communication between a merchant and an acquirer for purposes of settlement and clearing, in accordance with the present invention.

FIG. 5 illustrates the flow of communication between a merchant 16, an acquirer, service provider or payment processor, for example, MasterCard's Banknet, and an issuer for the purpose of settlement and clearing according to an exemplary embodiment of the present invention.

A clearing message is processed essentially in the same manner as an authorization request message. As previously described, the acquirer 18 (because of entries in its BIN table) automatically routes a clearing message using a pseudo account number preferably to the service provider 10 or payment processor. At this facility, the pseudo account number is replaced by the "real" account number, the acquirer BIN is replaced by the "pseudo" acquirer BIN, and the remainder of the Acquirer Reference Data is replaced by an index that the service provider can subsequently use to obtain the original Acquirer Reference Data. The clearing message with these changes is transmitted to the "real" card issuer 20, which processes the transaction in the normal way. If the acquirer happens to also be the issuer, the service provider returns the cleared transaction to the acquirer with the real account number and proper fee calculations.

Exception Processing

When a message about a transaction must be transmitted back to the acquirer or merchant from an issuer, the message is processed by the issuer as it normally would process any transaction message. Since the transaction as known to the issuer includes the "pseudo" acquirer BIN, the "pseudo" acquirer BIN will cause the transaction message to be routed to a service provider facility. At this facility the "real" account number is replaced by the pseudo account number, and the pseudo Acquirer Reference Data is replaced with the original Acquirer Reference Data. The transaction message is then routed to the acquirer, which processes it like any other such transaction message.

Issuance of Plastic Cards for Identification

In some situations, a cardholder may buy a ticket over the Internet and will be required, upon showing up at the event to which the ticket grants admission, to produce the card used in the transaction in order to authenticate rightful possession of the ticket.

To accommodate such situations, the service provider may issue and mail physical plastic cards to cardholders who obtain pseudo account numbers for Internet use. These cards would clearly indicate "for identification purposes only, not valid for transactions" on them. The embossed and encoded account number would be the pseudo account number, though the CVC2 may be that of the "real" payment card.

As another alternative, those merchants that have a legitimate need to authenticate a cardholder using a pseudo account number may register with the service provider (by providing to the service provider appropriate identification and authentication information), and the merchants will be provided with a secret key or certificate as cryptographic proof of their registration. Thereafter, such merchants may obtain "real" account numbers from a service provider facility by providing a copy of the pseudo-account-number transaction details under cryptographic authentication that authenticates both the transaction data and the merchants' right to obtain a "real" account number. The service provider may then forward the "real" account numbers in encrypted form to the merchants, so that the cardholders may be identified with the cards corresponding to their "real" account numbers.

Advantageously, the present invention provides enhanced security for the use of payment account numbers over the Internet.

The foregoing merely illustrates the principles of the invention. It will thus be appreciated that those skilled in the art will be able to devise numerous systems and methods which, although not explicitly shown or described herein, embody the principles of the invention and thus within the spirit and scope of the invention.

We claim:

1. A method of conducting a transaction using a payment account for payment over a payment network, the method comprising:
   (a) receiving by a service provider other than an issuer of the payment account a first authorization request for the authorization of the transaction using a first payment account number, wherein:
      (i) the first payment account number has a service provider identification number that is associated with the service provider other than the issuer and is associated with a second payment account number that has an issuer identification number associated with the issuer, said second payment account number not being included in said first authorization request;
      (ii) the first authorization request includes a first acquirer code associated with an acquirer; and
      (iii) the first authorization request is routable through the payment network to the service provider based on said service provider identification number;
   (b) responsive to the first authorization request, transmitting by the service provider a second authorization request for authorization of the transaction using the second payment account number, the second authorization request including a second acquirer code associated with the service provider and being routable through the payment network to the issuer based on said issuer identification number;
   (c) receiving from the issuer a response to the second authorization request transmitted by the service provider, the response including the second acquirer code and being routable through the payment network based on that code; and
   (d) transmitting from the service-provider to the acquirer a response to the first authorization request received by the service provider based on the response to the second authorization request received by the service-provider from the issuer, the response to the first authorization request including the first acquirer code and being routable through the payment network based on that code.

2. The method of claim 1, wherein said response to the second authorization request from the issuer further includes said second payment account number, and said response to the first authorization request by the service provider further includes said first payment account number.

3. The method of claim 1, wherein said first authorization request comprises a message authentication code including transaction data, and said request is formatted with a standard track having a plurality of fields including a discretionary field in which said message authentication code is placed.

4. The method of claim 3, wherein said service provider verifies the message authentication code.

5. A method of conducting a transaction with a merchant over a communications network using a first payment account number that is associated with a second payment account number, the method comprising:
   (a) generating a message authentication code based on one or more transaction details;
   (b) transmitting at least the first payment account number and the message authentication code to the merchant;
   (c) requesting by the merchant a first authorization request for payment of the transaction using the first payment account number, said second payment account number not being included in said first authorization request, the request being formatted as if payment were tendered at a point-of-sale terminal with a conventional magnetic-stripe payment card, the format having a track with at least a discretionary data field and said message authentication code being transmitted in said discretionary data field;
   (d) responsive to the authorization request for the first payment account number, requesting an authorization for payment of the transaction using the second payment account number; and
   (e) accepting or declining the authorization request for the first payment account number based on the response to the authorization request for the second payment account number and the message authentication code, wherein said first and second payment account numbers include respective service provider and issuer identification numbers, wherein a service provider other than the issuer receives said merchant's request through a payment network based on said service provider identification number, and wherein said service provider generates said request for authorization of payment using the second payment account number and routes said request to said issuer through said network based on said issuer identification number.

6. The method of claim 5, wherein said service provider includes in said request for authorization for payment an acquirer code associated with said service provider, such that said response from said issuer is routed back to said service provider.

7. The method of claim 6, wherein said request by said merchant includes an associated merchant acquirer code, and wherein said service provider generates a message based on said accepting or declining step and routes that message to said associated merchant acquirer code.

8. A method of conducting a transaction over a communications network, the method comprising:
   issuing by an issuer having an issuer identification number a first payment account number to a user having a computer, said issuer identification number being associated with said first payment account number;
   providing a security module for generating a secret key unique to each first account number issued;
   generating a second account number associated with said first payment account number;
   providing a secure payment application by a service provider to said computer, said application comprising said second account number and said secret key;
   storing said secure payment application on said computer;
   selecting a merchant with whom to conduct said financial transaction, said merchant having an associated acquirer code;
   passing to said computer transaction data;
   computer generating a message authentication code based on said transaction data;

transmitting track data in standard track image format to said merchant, said track data comprising said computer generated message authentication code and said second account number, wherein said computer generated message authentication code is directly positioned in the discretionary data field of the standard track image format;

generating a first authorization request based on said data;

transmitting said first request to said service provider;

verifying said first request with said secret key;

obtaining said first payment account number associated with said second account number;

transmitting a second authorization request using said first payment account number to said issuer identification number associated with said first payment account number; and authorizing or rejecting said second request.

9. The method of claim 8, wherein said track data comprises a discretionary data field, an account number field, and an expiration date field, and wherein said transmitting track data step further includes placing said message authentication data in said discretionary data field;

placing said second account number in said account number field; and placing an expiration date in said expiration date field.

10. The method of claim 9, wherein said transaction data include said associated acquirer code, and a transaction amount.

11. The method of claim 10, wherein said verifying step further includes verifying said transaction data.

12. The method of claim 8, wherein said second authorization request includes a second acquirer code associated with said service provider, and further comprising the steps of:

generating a message based on said authorizing or rejecting step;

forwarding said message to said service provider based on said acquirer code; and using said merchant's associated acquirer code to advise said merchant of said message.

* * * * *